Patented Oct. 25, 1927.

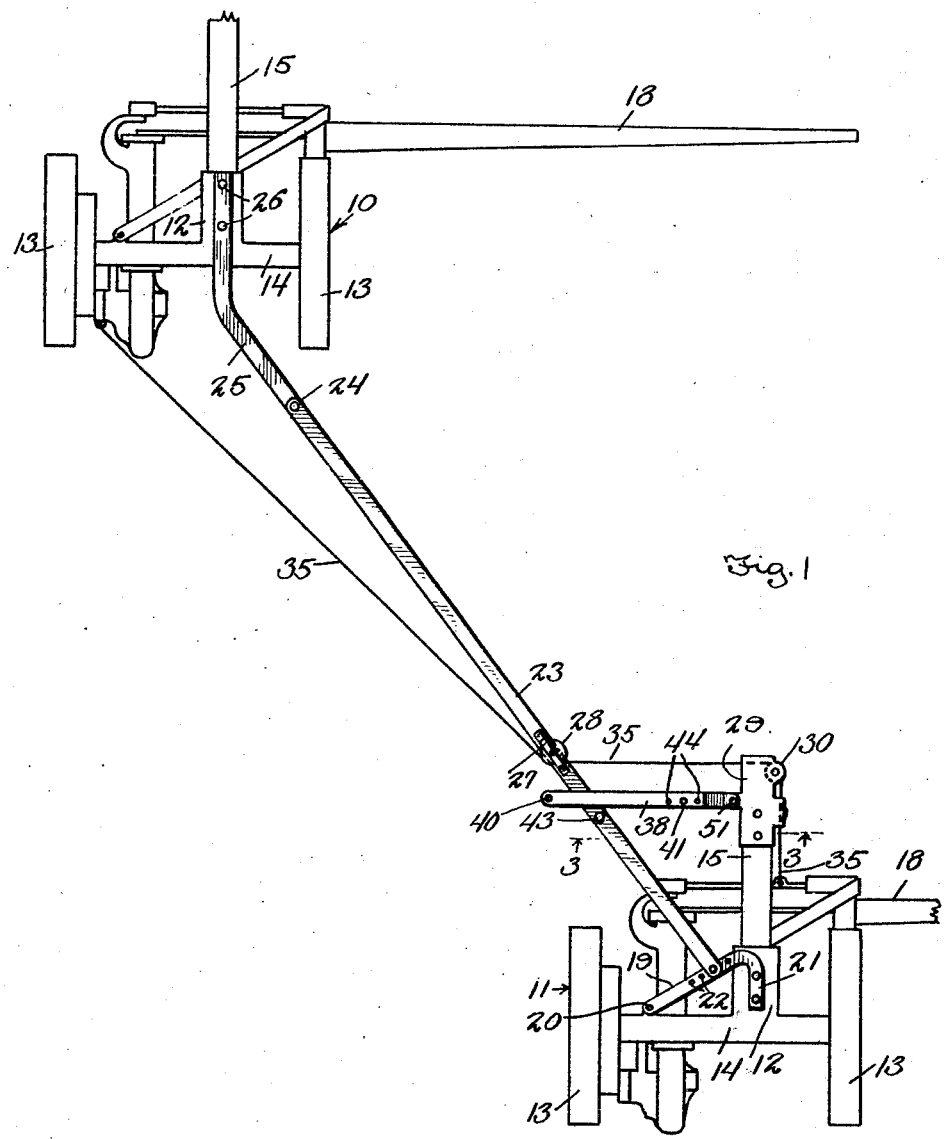

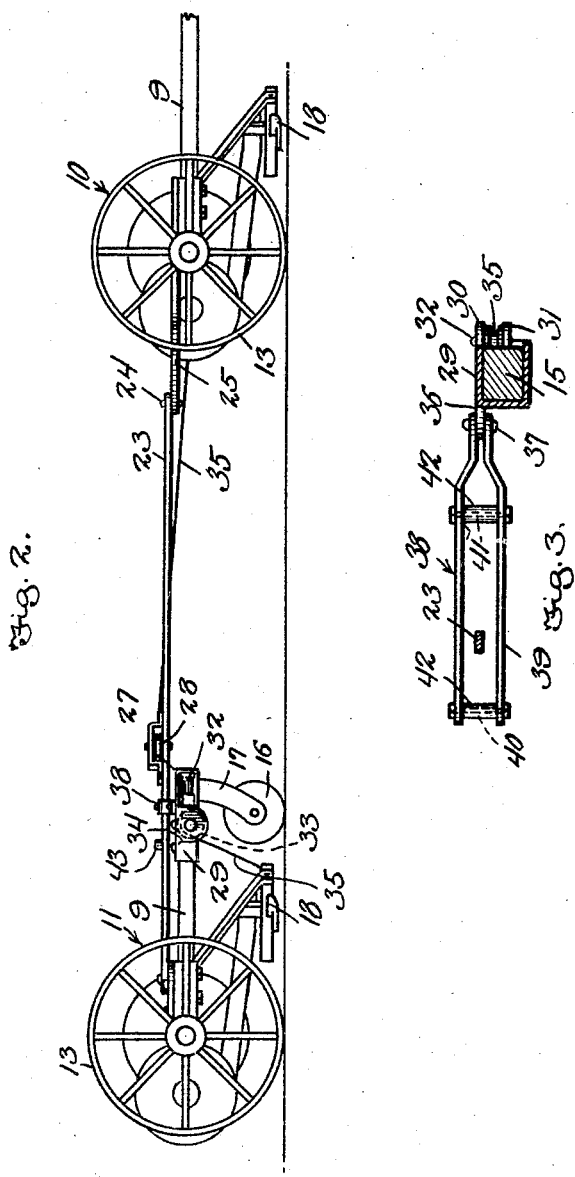

1,646,784

UNITED STATES PATENT OFFICE.

GEORGE E. COLLINS, OF ATKINSON, NEBRASKA.

IMPLEMENT DRAFT DEVICE.

Application filed October 29, 1926. Serial No. 145,053.

This invention relates to improvements in implement draft devices and has for its prime object to provide mechanism whereby a series of grain harvesters or similar agricultural machines may be connected together in tandem relation and drawn by a single tractor or the like.

A further object of the invention is the provision of a draft device whereby the machine will be automatically guided, so that the rear machine will travel in a course substantially parallel to that of the preceding machine.

A still further object of the invention is the provision of a draft device of the above character which is extremely simple and durable of construction and designed to operate efficiently.

Other objects and advantages of this invention will become more readily apparent during the course of the following description when taken in connection with the accompanying drawings.

In the drawings forming a part of this specification and in which like numerals are employed to designate corresponding parts throughout the same:

Figure 1 is a top plan view of my improved draft apparatus mounted in association with a pair of farm implements.

Figure 2 is a side elevation of the same, and

Figure 3 is a sectional view taken on line 3—3 of Figure 1.

In the drawings, wherein for the purpose of illustration has been shown one practical embodiment of my invention, the numerals 10 and 11 generally designate two mowing machines which have been shown to illustrate one application of my improved apparatus, the numeral 10 indicating the front mower and 11 the rear mower. It will be understood, however, that the apparatus is by no means restricted to this particular use and may be readily employed in connection with various types of agricultural machines.

These mowing machines illustrated in the accompanying drawings, are of conventional construction and each comprises a body 12 having a pair of parallel wheels 13 mounted on the outer extremities of a transverse axle 14. Mounted on the mower body 12 and extending forwardly thereof is a horizontal draft tongue 15 supported for turning movement through the medium of a comparatively small caster wheel 16 mounted in a forked bracket 17. Connected with the mower body and extending laterally from one side thereof is a cutting apparatus 18 which is of the usual construction and it will be noted that the outer end of the cutting apparatus of the front mower 10 is in a direct line in a front to rear direction with the inner end of the cutting apparatus of the rear mower 11. The foregoing structure, with the possible exception of the draft tongue 15 is conventional and embodied in the standard forms of mowers. In some instances, however, it will be necessary to provide means for mounting the tongue 15 in association with the standard equipment so that my improved draft device may be readily employed therewith.

It is to be understood, that while I have shown and described my improved apparatus employed in connection with mowing machines, it is not restricted to this particular use and may, with slight modification be employed upon various types of harvesters and other farm machines to permit same to be drawn in tandem relation by a tractor or other source of power.

In carrying out my invention, I provide an angular bracket member 19 which is associated with the rear mower 11 and has one end thereof connected as at 20 to the axle 14 while the opposite end thereof is angularly directed as at 21 and secured to the body 12, said bracket member being provided with a plurality of spaced apertures 22, the purpose of which will be more fully hereinafter described.

The front and rear mowers are connected in tandem formation by means of a longitudinally extending draw bar 23 apertured at its rear extremity for pivotal connection with the bracket member 19, the apertures 22 being provided so that the point of connection of the draw bar may be readily varied. The outer or forward end of the draw bar 23 is pivotally connected as at 24 to one end of a short angularly positioned draw bar 25, the forward portion of which is forwardly directed and secured as at 26 to the body 12 of the front mower 10.

Carried by the draw bar 23 adjacent its rear end is a U-shaped pulley bracket 27, flanged at the extremities so that the same may be securely mounted on the said draw bar and adapted to support a deep grooved pulley 28. This pulley is rotatably supported upon a shaft extending between the bracket 27 and the draw bar and spaced by suitable washers to permit free rotation. Fitted over and secured to the end of the draft tongue 15 of the rear mower 11 is a sleeve 29 provided at one side thereof with spaced ears 30 and 31 between which is mounted a pulley 32, this pulley being mounted in a horizontal position in substantially transverse alinement with the pulley 28 mounted on the draw 23. A second pulley 33 is also carried by the sleeve 29 rearwardly of the pulley 32 and a shield 34 is provided for the said pulley 33 the pulley 33 being vertically disposed.

These pulleys are provided with comparatively deep annular grooves so as to be securely engaged by a guide cable 35, the forward end of said cable being secured to the left side portion of the front mower 10 and the same extending rearwardly over the pulleys 28, 32 and 33, the rear extremity of the cable being secured to the forward central portion of the rear mower 11. It is desirable that the forward extremity of the guide cable 35 be secured to the left hand extremity of the preceding implement frame, adjacent the left wheel, this arrangement permitting turning of the harvesters in tandem formation in full operation.

The sleeve 29 is provided at the side thereof opposite the pulleys 32 and 33 with a laterally extending ear 36 to which are pivoted as at 37 the inner ends of upper and lower guide arms 38 and 39, said guide arms extending beyond the draw bar 23 and being connected by means of suitable bolts 40 and 41, suitable spacing collars 42 encircling the said bolts for retaining the arms 38 and 39 in properly spaced position relative to each other. The arms 38 and 39 are arranged between the U-shaped pulley bracket 27 and a stop 43 carried by the draw bar 23. The arms 38 and 39 are further provided with a plurality of spaced openings 44 whereby the bolt 41 may be adjusted inwardly or outwardly.

In use, my improved apparatus may be readily secured upon harvesters or like machines, to permit a plurality of these machines to be drawn in tandem formation by a single source of power, such as a tractor. The machines are arranged in laterally offset positions so as to follow parallel paths. The series of openings 22 formed in the bracket member 19 permit adjustment of the rear end of the draw bar 23 so as to permit regulation of the forward direction of travel. This is necessary for the perfect operation of my improved apparatus, enabling the rear end of the draw bar to be connected toward the inner side of the rear machine so that the machine will tend to travel in an outwardly directed path. This tendency of the implement is restricted by means of the cable 35 which is arranged in such manner as to direct the machine in a forward parallel path. It is obvious, however, that when using the draft device upon mowers, the dragging tendency of the outwardly directed cutting mechanism 18 will in itself have a tendency to slue the machine in an inward direction or toward the right so that the draw bar, on this type of machine, may be connected to substantially the central portion of the bracket. Upon other machines, the structure of which would permit the machine to normally travel in a forward direction, the draft bar may be shifted to the inner, that is in the present arrangement, toward the left hand side of the machine, thus exerting a pull on this side of the machine and tending to turn the machine in an outward direction. The provision of the guide rope or cable 35 will thus retain the series of machines in properly directed courses and permit the entire series of machines to be turned while in operation. This movement is apparent, as, when the forward draft vehicle is turned in a right hand direction each of the machines arranged in tandem series will initially be rotated in a left hand direction so as to travel in an arcuate path concentric with the movement of the preceding front machine.

Upon the turning of each of the machines arranged in tandem series to the left, the guide pin 41 engaging with the draw bar 23 will cause the machine to be directed forwardly. Thus, it will be apparent that the guide arms 38 and 39 and pins 40 and 41 assist in turning the machine either to the left or to the right. The pin 41 may be adjusted to either one of the openings 44 so as to regulate the turning point of the machine.

It will further be noted, that the apparatus which is of extreme simplicity in construction may be very easily mounted upon the various types of harvesters by the ordinary workmen having a knowledge of farm machinery and permit removal so that the apparatus may be readily disconnected from one implement and mounted upon another.

It is to be understood that the form of my invention herewith shown and described is to be taken as the preferred example of the same and that various changes as to the shape, size and arrangement of parts may be resorted to without departing from the spirit of the invention or the scope of the subjoined claims.

What is claimed is:

1. A draft device of the class described including a bracket, means for mounting the said bracket upon a machine to be drawn, a draw bar pivotally mounted upon the bracket and adapted for connection with a second machine, a plurality of pulleys mounted on the draw bar and machine, a guide rope secured to the machines and trained over the said pulleys, the said draw bar and rope being arranged for guiding the machines in parallel paths.

2. A draft device of the class described including in combination with farm machines to be drawn, a bracket to be rigidly mounted on one of the machines, a draw bar having one end thereof pivotally connected upon said bracket, a stationary draw bar rigidly secured to the other machine and adapted to have pivotally connected thereto the forward end of the first named draw bar, a plurality of pulleys mounted upon the draw bar and first mentioned machine, and a guide rope secured to the rear side portion of the first mentioned machine and extending over the pulleys and secured to the forward central portion of the second mentioned machine, the said draw bar and guide rope being arranged to guide the machines in parallel paths.

3. A draft device of the class described including in combination with farm machines to be drawn, a bracket rigidly mounted on one of the machines, a draw bar pivotally connected with the bracket and connected with the other machine, a plurality of pulleys mounted on the draw bar and first mentioned machine, a guide rope secured to the machines and trained over the said pulleys, guide arms carried by the first mentioned machine and extending laterally therefrom and beyond said draw bar, and abutment elements carried by the said arms at opposite sides of the draw bar.

4. A draft device of the class described including in combination with machines to be drawn, a bracket rigidly mounted upon one of the machines, a draw bar having its rear end pivotally connected to the said bracket, a stationary draw bar rigidly secured to the other machine and having pivotally connected thereto the forward end of the first mentioned draw bar, a plurality of pulleys mounted upon the draw bar and first mentioned machine, a guide rope secured to the rear side portion of the first mentioned machine and extending over the pulleys and secured to the forward central portion of the other machine, guide arms carried by the first mentioned machine and extending laterally therefrom and beyond said draw bar, and abutment elements carried by the said arms at opposite sides of the said draw bar.

5. A draft device of the class described including in combination with machines to be drawn, a bracket mounted upon one of said machines, a draw bar pivotally connected at one end to said bracket and at its opposite end connected with the other machine, a sleeve carried by the draft tongue of the first mentioned machine, a plurality of pulleys mounted on the draw bar and sleeve, a pair of spaced guide arms carried by and extending laterally from the sleeve beyond the said draw bar, and pins connecting the said arms at opposite sides of the draw bar, one of said pins being adjustable towards and away from the said draw bar.

6. In combination with a series of agricultural machines, an automatically guiding draft device including a bracket member mounted upon one of said machines, a draw bar pivotally connected at one end of the bracket member and at its opposite end to the other machine, the rear end of said draw bar being connected to the bracket so as to normally direct the rear machine in an outwardly directed course, and a guide rope secured to the machines and adapted to restrict the outward movement of the rear machine and retain the same in a path parallel to the path of the front machine.

In testimony whereof I affix my signature.

GEORGE E. COLLINS.